US012632264B2

(12) United States Patent
Chen et al.

(10) Patent No.: US 12,632,264 B2
(45) Date of Patent: May 19, 2026

(54) FAST SERVICE INITIALIZATION USING REMOTE MEMORY

(71) Applicant: Dell Products L.P., Round Rock, TX (US)

(72) Inventors: Xiangping Chen, Sherborn, MA (US); William Price Dawkins, Lakeway, TX (US); Walter Aldrich O'Brien, III, Westborough, MA (US); Xunce Zhou, Harvard, MA (US)

(73) Assignee: Dell Products L.P., Round Rock, TX (US)

( * ) Notice: Subject to any disclaimer, the term of this patent is extended or adjusted under 35 U.S.C. 154(b) by 213 days.

(21) Appl. No.: 18/348,556

(22) Filed: Jul. 7, 2023

(65) Prior Publication Data

US 2025/0013472 A1    Jan. 9, 2025

(51) Int. Cl.
*G06F 9/4401* (2018.01)
(52) U.S. Cl.
CPC .................................. *G06F 9/4401* (2013.01)
(58) Field of Classification Search
CPC ...................................................... G06F 9/4401
See application file for complete search history.

(56) References Cited

U.S. PATENT DOCUMENTS

2015/0178097 A1* 6/2015 Russinovich ........... G06F 8/656
                                                    713/2
2017/0235562 A1* 8/2017 Bafna ................. G06F 11/2046
                                                    718/1

* cited by examiner

*Primary Examiner* — Kim Huynh
(74) *Attorney, Agent, or Firm* — Chamberlain, Hrdlicka, White, Williams & Aughtry; Aly Z. Dossa

(57) ABSTRACT

A method for fast service initialization. The method includes: following deployment of a composed service on a composed service host and the composed service host thereafter experiencing an event impacting the composed service: loading a modified service initialization routine for the composed service; discovering, based on the modified service initialization routine, a service initialization memory namespace using a namespace identifier (ID) assigned thereto; presenting the service initialization memory namespace on the composed service host as remote initialization memory; retrieving initialization-pertinent information for the composed service from the remote initialization memory; and initializing the composed service using the initialization-pertinent information.

14 Claims, 7 Drawing Sheets

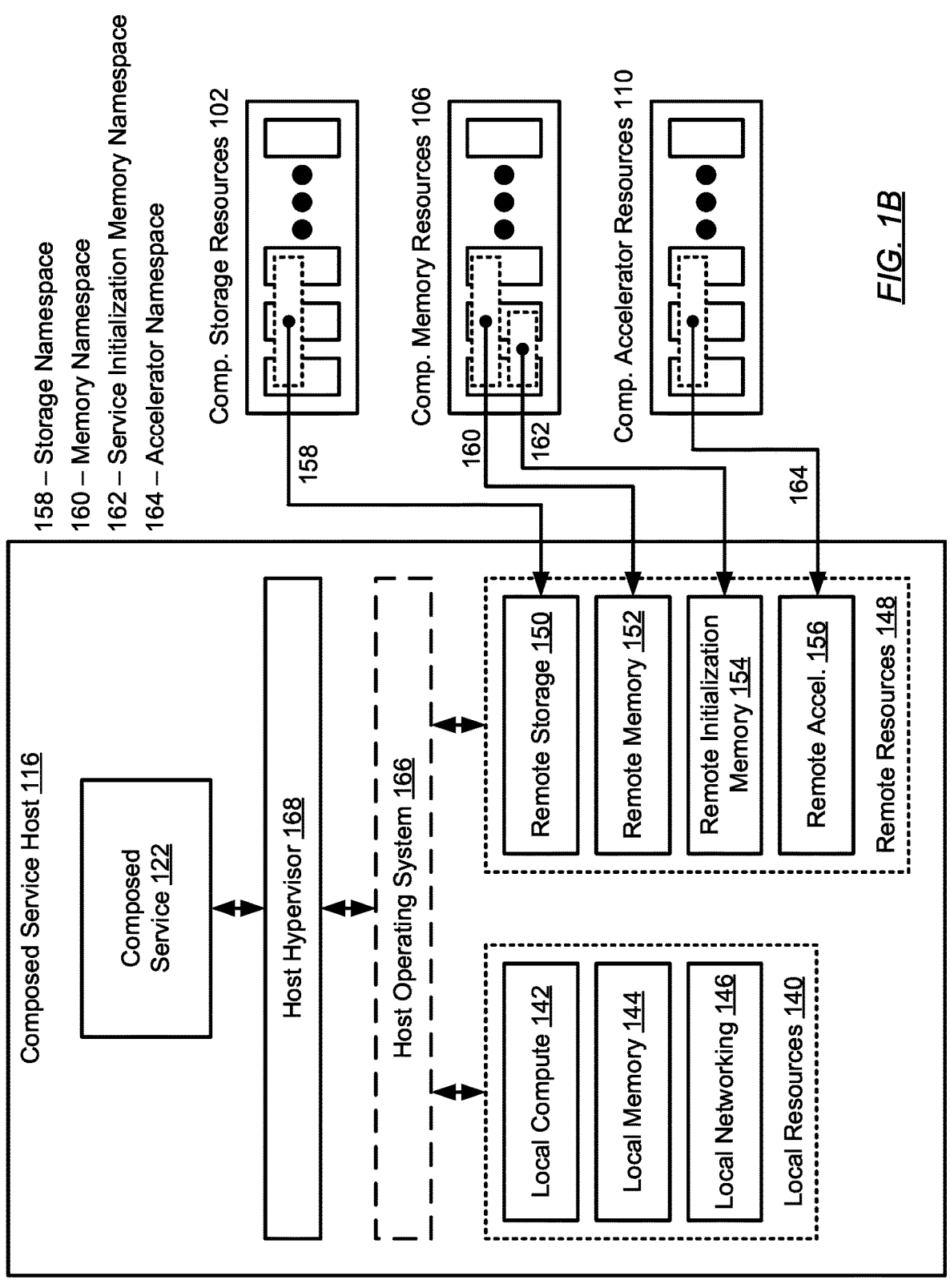

158 – Storage Namespace
160 – Memory Namespace
162 – Service Initialization Memory Namespace
164 – Accelerator Namespace Comp. Storage Resources 102

Comp. Memory Resources 106

Comp. Accelerator Resources 110

Composed Service Host 116

Composed Service 122

Host Hypervisor 168

Host Operating System 166

Remote Storage 150

Remote Memory 152

Remote Initialization Memory 154

Remote Accel. 156

Remote Resources 148

Local Compute 142

Local Memory 144

Local Networking 146

Local Resources 140

FIG. 1B

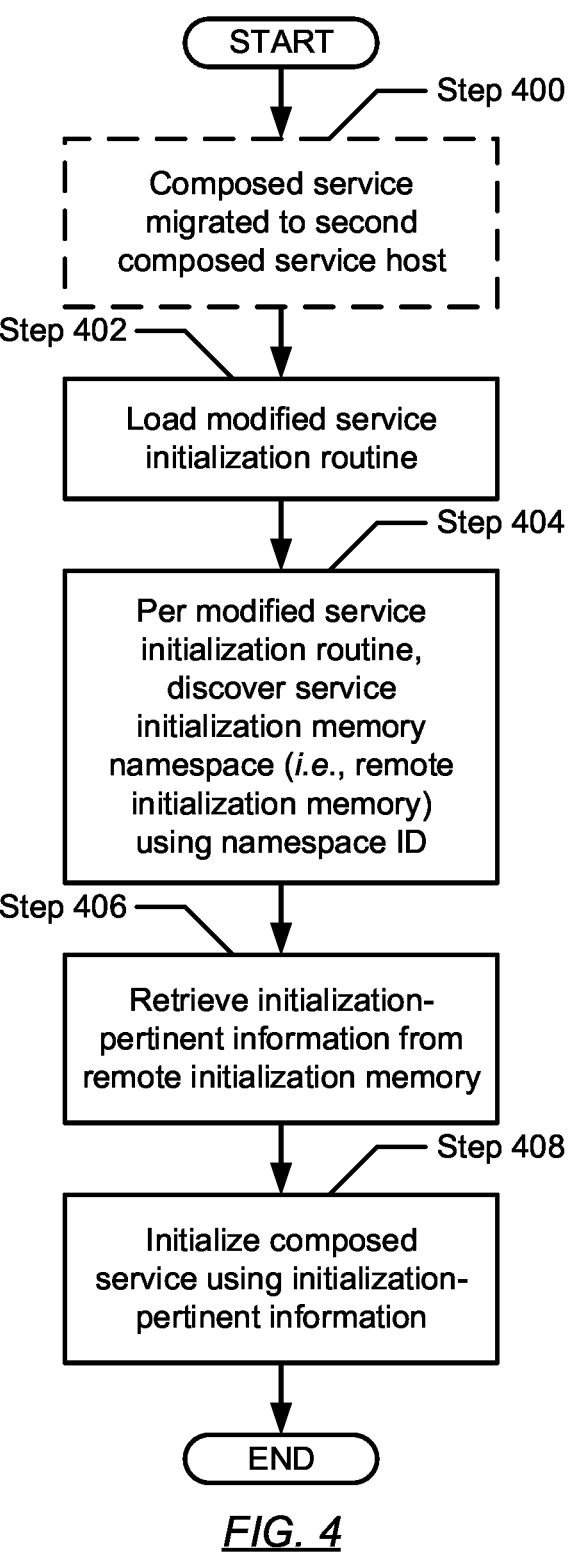

START

Step 400

Composed service
migrated to second
composed service host

Step 402

Load modified service
initialization routine

Step 404

Per modified service
initialization routine,
discover service
initialization memory
namespace (*i.e.*, remote
initialization memory)
using namespace ID Step 406

Retrieve initialization-
pertinent information from
remote initialization memory Step 408

Initialize composed
service using initialization-
pertinent information

END

*FIG. 4*

FAST SERVICE INITIALIZATION USING REMOTE MEMORY

BACKGROUND

With stateless services, initialization-pertinent information (e.g., service configuration settings, long-term service state, and service metadata), respective to said stateless services, is often stored in the local memory of service-hosting hardware (e.g., a network server). However, said initialization-pertinent information is typically lost during fault events impacting the service-hosting hardware.

SUMMARY

In general, in one aspect, embodiments described herein relate to a method for fast service initialization. The method includes: following deployment of a composed service on a composed service host and the composed service host thereafter experiencing an event impacting the composed service: loading a modified service initialization routine for the composed service; discovering, based on the modified service initialization routine, a service initialization memory namespace using a namespace identifier (ID) assigned thereto; presenting the service initialization memory namespace on the composed service host as remote initialization memory; retrieving initialization-pertinent information for the composed service from the remote initialization memory; and initializing the composed service using the initialization-pertinent information.

In general, in one aspect, embodiments described herein relate to a non-transitory computer readable medium. The non-transitory computer readable medium includes computer readable program code, which when executed by a computer processor on a composed service host, enables the computer processor to perform a method for fast service initialization. The method includes: following deployment of a composed service on the composed service host and the composed service host thereafter experiencing an event impacting the composed service: loading a modified service initialization routine for the composed service; discovering, based on the modified service initialization routine, a service initialization memory namespace using a namespace identifier (ID) assigned thereto; presenting the service initialization memory namespace on the composed service host as remote initialization memory; retrieving initialization-pertinent information for the composed service from the remote initialization memory; and initializing the composed service using the initialization-pertinent information.

In general, in one aspect, embodiments described herein relate to a service composition infrastructure. The service composition infrastructure includes: a composed service host including: a computer processor; and a host hypervisor executing on the computer processor, and configured to perform a method for fast service initialization. The method includes: following deployment of the composed service on the composed service host and the composed service host thereafter experiencing an event impacting the composed service: loading a modified service initialization routine for the composed service; discovering, based on the modified service initialization routine, a service initialization memory namespace using a namespace identifier (ID) assigned thereto; presenting the service initialization memory namespace on the composed service host as remote initialization memory; retrieving initialization-pertinent information for the composed service from the remote initialization memory; and initializing the composed service using the initialization-pertinent information.

Other aspects of the invention will be apparent from the following description and the appended claims.

BRIEF DESCRIPTION OF DRAWINGS

Certain embodiments described herein will be described with reference to the accompanying drawings. However, the accompanying drawings illustrate only certain aspects or implementations of the embodiments by way of example and are not meant to limit the scope of the claims.

FIG. 1B shows a composed service deployed on a composed service host in accordance with one or more embodiments described herein.

FIG. 4 shows a flowchart describing a method for fast service initialization using remote memory in accordance with one or more embodiments described herein.

DETAILED DESCRIPTION

Figure 1A:
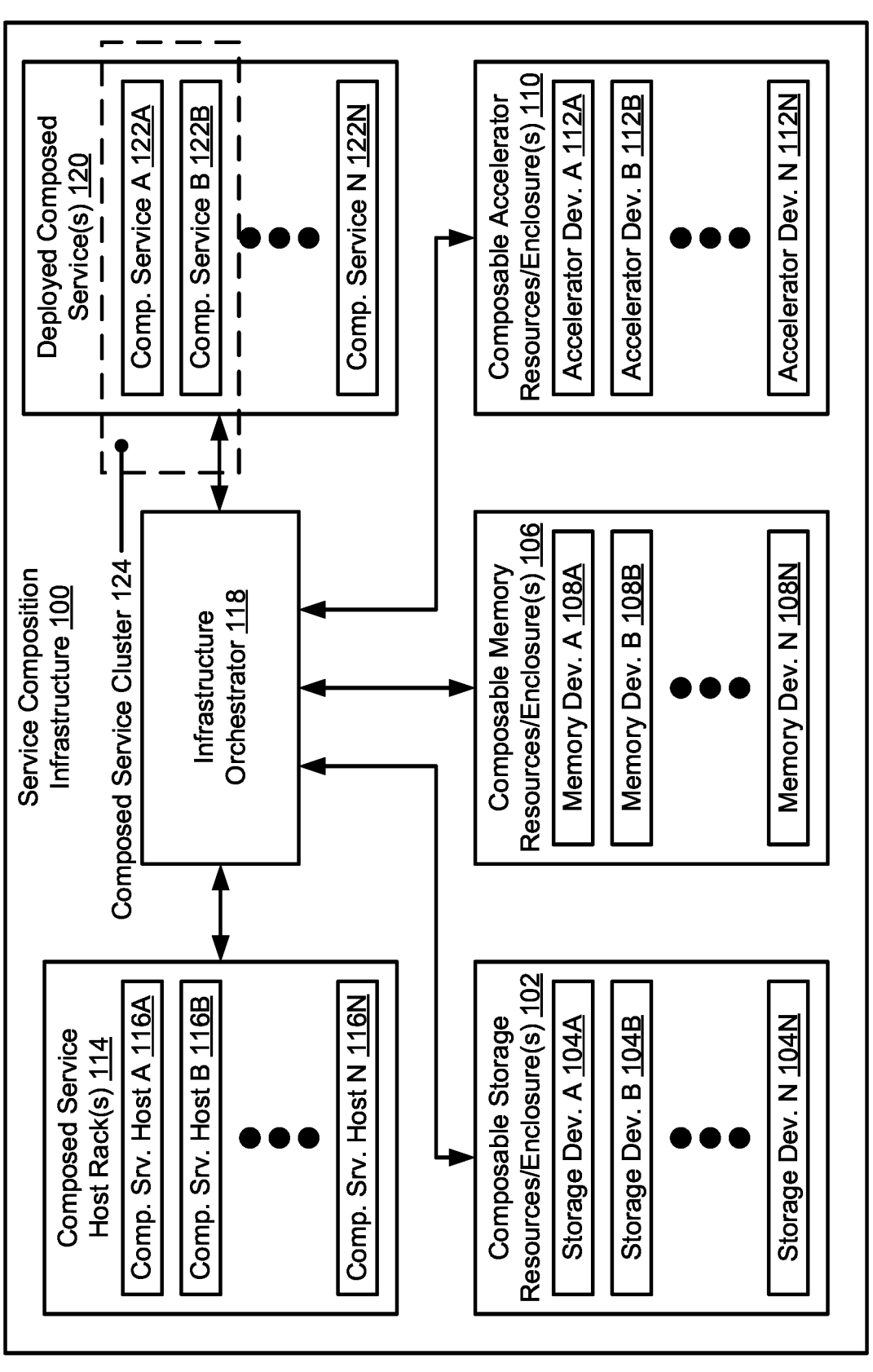
FIG. 1A shows a service composition infrastructure in accordance with one or more embodiments described herein.

Specific embodiments will now be described with reference to the accompanying figures.

In the below description, numerous details are set forth as examples of embodiments described herein. It will be understood by those skilled in the art (who also have the benefit of this Detailed Description) that one or more embodiments of embodiments described herein may be practiced without these specific details, and that numerous variations or modifications may be possible without departing from the scope of the embodiments described herein. Certain details known to those of ordinary skill in the art may be omitted to avoid obscuring the description.

In the below description of the figures, any component described with regard to a figure, in various embodiments described herein, may be equivalent to one or more like-named components described with regard to any other figure. For brevity, descriptions of these components may not be repeated with regard to each figure. Thus, each and every embodiment of the components of each figure is incorporated by reference and assumed to be optionally present within every other figure having one or more like-named components. Additionally, in accordance with various embodiments described herein, any description of the components of a figure is to be interpreted as an optional embodiment, which may be implemented in addition to, in conjunction with, or in place of the embodiments described with regard to a corresponding like-named component in any other figure.

Throughout the application, ordinal numbers (e.g., first, second, third, etc.) may be used as an adjective for an element (i.e., any noun in the application). The use of ordinal numbers is not to imply or create any particular ordering of the elements, nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

Throughout this application, elements of figures may be labeled as A to N. As used herein, the aforementioned labeling means that the element may include any number of items and does not require that the element include the same number of elements as any other item labeled as A to N. For example, a data structure may include a first element labeled as A and a second element labeled as N. This labeling convention means that the data structure may include any number of the elements. A second data structure, also labeled as A to N, may also include any number of elements. The number of elements of the first data structure and the number of elements of the second data structure may be the same or different.

As used herein, the phrase operatively connected, or operative connection, means that there exists between elements/components/devices a direct or indirect connection that allows the elements to interact with one another in some way. For example, the phrase 'operatively connected' may refer to any direct (e.g., wired directly between two devices or components) or indirect (e.g., wired and/or wireless connections between any number of devices or components connecting the operatively connected devices) connection. Thus, any path through which information may travel may be considered an operative connection.

In general, embodiments described herein relate to fast service initialization using remote memory. With stateless services, initialization-pertinent information (e.g., service configuration settings, long-term service state, and service metadata), respective to said stateless services, is often stored in the local memory of service-hosting hardware (e.g., a network server). However, said initialization-pertinent information is typically lost during fault events including, but not limited to, power cycling, rebooting, failover to secondary/backup service-hosting hardware, and migration to different service-hosting hardware. Furthermore, for any stateless service to reach a functional state, an initialization routine is typically followed, which may, for example, include the programming of the service configuration settings, the reloading of the service metadata and long-term service state, and the warming up of cache memory. For stateless services reliant on the heavy usage of memory, the execution of any initialization routine, which is contingent on initialization-pertinent information retrieved from local memory, may result in extensive startup times during which performance is either unavailable or degraded.

Embodiments described herein, accordingly, implement a solution addressing the above-mentioned issue(s), and thus directed to fast service initialization, by leveraging remote memory access through low latency networks (e.g., compute express link (CXL) networks). Particularly, the solution proposes storing the initialization-pertinent information within remote memory external to the service-hosting hardware. Subsequently, when any fault events transpire involving the service-hosting hardware, the remote memory remains intact and can be accessed to initialize (or re-initialize) the stateless service(s) without the imposition of lengthy startups following said fault events.

FIG. 1A shows a service composition infrastructure in accordance with one or more embodiments described herein. The service composition infrastructure (100) may represent any enterprise information technology (IT) infrastructure at least configured to function as a service delivery platform.

To that extent, the service composition infrastructure (100) may include functionality to: create, delete, configure, and deploy services (described below); manage and provision both physical and virtual resources as needed to support the operation of deployed services; and facilitate fast services initialization using remote memory. One of ordinary skill, however, will appreciate that the service composition infrastructure (100) may perform other functionalities without departing from the scope of the embodiments described herein.

In one or many embodiment(s) described herein, the service composition infrastructure (100) may be implemented through on-premises infrastructure, cloud computing infrastructure, or any hybrid infrastructure thereof. The service composition infrastructure (100), accordingly, may be implemented using one or more network servers, where each network server may represent a physical or a virtual network server. Additionally, or alternatively, the service composition infrastructure (100) may be implemented using one or more computing systems similar to the exemplary computing system illustrated and described with respect to FIG. 5, below.

In one or many embodiment(s) described herein, the service composition infrastructure (100) may include composable storage resources (102), composable memory resources (106), composable accelerator resources (110), one or more composed service host racks (114), an infrastructure orchestrator (118), and one or more deployed composed services (120). Each of these service composition infrastructure (100) components is described below.

In one or many embodiment(s) described herein, the composable storage resources (102) may represent disaggregated storage, or scalable enterprise storage resources that form a logical storage pool. The logical storage pool, and thus the composable storage resources (102), may be implemented through the connection or combination of one or more physical storage devices (104A-104N) over a network fabric. Further, any granularity of the composable storage resources (102) may be dynamically provisioned or de-provisioned to any of the deployed composed service(s) (120) based at least on the workload(s) executed by said any of the deployed composed service(s) (120). Any dynamically provisioned granularity of the composable storage resources (102) may be presented and accessed as a storage namespace (not shown) (or at least a namespace partition thereof). Any given storage namespace may refer to a logically separated, individually addressable subset of the logical storage pool that may span, in whole or in part, on/across one or more physical storage devices (104A-104N).

In one or many embodiment(s) described herein, each physical storage device (104A-104N) may encompass non-transitory computer readable storage media on which various forms of digital information (e.g., structured and unstructured data) may be stored in whole or in part, and temporarily or permanently. Examples of non-transitory computer readable storage media may include, but may not be limited to, optical storage (e.g., compact discs (CDs) and digital versatile discs (DVDs)), magnetic storage (e.g., magnetic tapes, floppy disks, and hard disk drives (HDDs)), and solid state storage (e.g., solid state drives (SSDs), thumb drives, and secure digital (SD) cards).

In one or many embodiment(s) described herein, the one or more physical storage devices (104A-104N) may be physically housed together within one or more enclosures (also referred herein as composable storage enclosures). Any composable storage enclosure, therefore, may include: one or more physical storage devices (104A-104N); a network fabric (or a portion thereof) interconnecting the one or more physical storage devices (104A-104N) therein to each other as well as to at least the infrastructure orchestrator (118); and at least one power supply configured to provide electrical power to the one or more physical storage devices (104A-104N) therein. One of ordinary skill will appreciate, however, that any composable storage enclosure may include additional subcomponents without departing from the scope of the embodiments described herein.

In one or many embodiment(s) described herein, the composable memory resources (106) may represent disaggregated memory, or scalable enterprise memory resources that form a logical memory pool. The logical memory pool, and thus the composable memory resources (106), may be implemented through the connection or combination of one or more physical memory devices (108A-108N) over a network fabric. Further, any granularity of the composable memory resources (106) may be dynamically provisioned or de-provisioned to any of the deployed composed service(s) (120) based at least on the workload(s) executed by said any of the deployed composed service(s) (120). Any dynamically provisioned granularity of the composable memory resources (106) may be presented and accessed as a memory namespace (not shown) (or at least a namespace partition thereof). Any given memory namespace may refer to a logically separated, individually addressable subset of the logical memory pool that may span, in whole or in part, on/across one or more physical memory devices (108A-108N).

In one or many embodiment(s) described herein, each physical memory device (108A-108N) may encompass non-transitory computer readable memory media on which various forms of digital information (e.g., structured and unstructured data) may be stored in whole or in part, and temporarily or permanently. Examples of non-transitory computer readable memory media may include, but may not be limited to, volatile memory (e.g., static random access memory (SRAM), dynamic random access memory (DRAM), and synchronous dynamic random access memory (SDRAM)) and non-volatile memory (e.g., read-only memory (ROM) and flash memory).

In one or many embodiment(s) described herein, the one or more physical memory devices (108A-108N) may be physically housed together within one or more enclosures (also referred herein as composable memory enclosures). Any composable memory enclosure, therefore, may include: one or more physical memory devices (108A-108N); a network fabric (or a portion thereof) interconnecting the one or more physical memory devices (108A-108N) therein to each other as well as to at least the infrastructure orchestrator (118); and at least one power supply configured to provide electrical power to the one or more physical memory devices (108A-108N) therein. One of ordinary skill will appreciate, however, that any composable memory enclosure may include additional subcomponents without departing from the scope of the embodiments described herein.

In one or many embodiment(s) described herein, the composable accelerator resources (110) may represent disaggregated accelerated computing, or scalable enterprise accelerator resources that form a logical accelerator pool. The logical accelerator pool, and thus the composable accelerator resources (110), may be implemented through the connection or combination of one or more physical accelerator devices (112A-112N) over a network fabric. Further, any granularity of the composable accelerator resources (110) may be dynamically provisioned or de-provisioned to any of the deployed composed service(s) (120) based at least on the workload(s) executed by said any of the deployed composed service(s) (120). Any dynamically provisioned granularity of the composable accelerator resources (110) may be presented and accessed as an accelerator namespace (not shown) (or at least a namespace partition thereof). Any given accelerator namespace may refer to a logically separated, individually addressable subset of the logical accelerator pool that may span, in whole or in part, on/across one or more physical accelerator devices (112A-112N).

In one or many embodiment(s) described herein, each physical accelerator device (112A-112N) may encompass specialized hardware configured to speed up demanding workloads through the use of parallel processing. Examples of said specialized hardware may include, but may not be limited to, a graphics processing unit (GPU), a data processing unit (DPU), a tensor processing unit (TPU), and a vision processing unit (VPU).

In one or many embodiment(s) described herein, the one or more physical accelerator devices (112A-112N) may be physically housed together within one or more enclosures (also referred herein as composable accelerator enclosures). Any composable accelerator enclosure, therefore, may include: one or more physical accelerator devices (112A-112N); a network fabric (or a portion thereof) interconnecting the physical accelerator devices (112A-112N) therein to each other as well as to at least the infrastructure orchestrator (118); and at least one power supply configured to provide electrical power to the one or more physical accelerator devices (112A-112N) therein. One of ordinary skill will appreciate, however, that any composable accelerator enclosure may include additional subcomponents without departing from the scope of the embodiments described herein.

In one or many embodiment(s) described herein, any composed service host rack (114) may represent a physical framework or structure configured to at least house multiple physical network servers (referred to herein as composable service hosts (116A-116N)). Each composable service host (116A-116N), therefore, may refer to any physical network server at least configured to provide an environment in which one or more composed services (described below) may be deployed and execute thereon. Further, in providing said environment for any composed service(s) deployed thereon, each composable service host (116A-116N) may include and allocate various local resources (e.g., compute, memory, virtualization, and networking), as needed, to the composed service(s) and/or the tasks (or workloads) instantiated thereby. An example composed service host (116A-116N) with a deployed composed service is illustrated and described in further detail with respect to FIG. 1B, below.

In one or many embodiment(s) described herein, the infrastructure orchestrator (118) may represent instruction-processing hardware (e.g., any number of integrated circuits for processing computer readable instructions), a computer program executing on the underlying hardware of the service composition infrastructure (100), or any combination thereof, at least configured to oversee and/or manage service composition infrastructure (100) operations. To that extent, the infrastructure orchestrator (118) may include functionality to: create, distribute, and delete service initialization memory namespaces—a method that is illustrated and described with respect to FIGS. 2A and 2B, below. One of ordinary skill, however, will appreciate that the infrastructure orchestrator (118) may perform other functionalities without departing from the scope of the embodiments described herein.

In one or many embodiment(s) described herein, the deployed composed service(s) (120) may represent one or more composed services (122A-122N) that has/have been configured and, subsequently, deployed on any of the composable service host(s) (116A-116N). Any composable service (122A-122N), in turn, may refer to a virtual network server (e.g., a virtual machine or a container configured to emulate a physical network server) whereon a guest operating system and/or any number of workloads (e.g., applications) may execute. Further, any composable service (122A-122N), deployed on any composable service host (116A-116N), may have access to local resources physically installed in said any composable service host (116A-116N) and to remote resources (e.g., at least one of composable storage resources (102), composable memory resources (106), and composable accelerator resources (110)) logically provisioned via corresponding namespaces.

In one or many embodiment(s) described herein, the deployed composed service(s) (120) may be grouped into one or more composed service clusters (124). That is, any composed service cluster (124) may refer to a collection of zero or more composed services (122A-122N) that may be grouped together based on one or more criteria (e.g., execution of similar workloads, having similar resource requirements, employed by a same tenant or customer, etc.).

In one or many embodiment(s) described herein, the above-mentioned service composition infrastructure (100) components (or subcomponents thereof) may communicate with one another through one or more networks (not shown) (e.g., a local area network (LAN), a wide area network (WAN) such as the Internet, a mobile network, any other network type (e.g., a compute express link (CXL) network, an InfiniBand network, etc.), or any combination thereof). The network(s) may be implemented using any combination of wired and/or wireless connections. Further, the network(s) may encompass various interconnected, network-enabled subcomponents (or systems) (e.g., switches, routers, gateways, etc.) that may facilitate communications between the above-mentioned service composition infrastructure (100) components (or subcomponents thereof). Moreover, in communicating with one another, the above-mentioned service composition infrastructure (100) components (or subcomponents thereof) may employ any combination of wired and/or wireless communication protocols.

While FIG. 1A shows a configuration of components and/or subcomponents, other service composition infrastructure (100) configurations may be used without departing from the scope of the embodiments described herein.

FIG. 1B shows a composed service deployed on a composed service host in accordance with one or more embodiments described herein. The composed service host (116) may include local resources (140), remote resources (148), an optional host operating system (166), a host hypervisor (168), and the composed service (122) deployed thereon. Each of these composed service host (116) components is described below.

In one or many embodiment(s) described herein, any local resource (140) may refer to a physical resource natively available to, or physically installed on, the composed service host (116). The local resources (140) may include local compute (142), local memory (144), and local networking (146). The local compute (142) may encompass any number of integrated circuits for processing computer readable instructions (e.g., central processing unit(s) (CPU) also referred herein to as computer processors). The local memory (144) may encompass any number of non-volatile and/or volatile memory devices. The local networking (146)

may encompass any number of integrated circuits for receiving and transmitting data over any number of networks (e.g., network adapter(s), network interface(s), etc.).

In one or many embodiment(s) described herein, any remote resource (148) may refer to a virtual resource abstracted from physical resources of the same resource type, where said physical resources reside external to any/the composed service host (116) yet remain operatively connected thereto via one or more networks. The remote resources (148) may include remote storage (150), remote memory (152), remote initialization memory (154), and remote acceleration (also referred to herein as remote accelerated computing) (156).

In one or many embodiment(s) described herein, the remote storage (150) may encompass virtual storage provisioned to the composed service host (116) or, more specifically, to the composed service (122) deployed thereon. The remote storage (150) may be backed by or abstracted from at least a subset of at least one physical storage device—each in whole or in part—which, through interconnection or combination, form a logical storage pool referred to herein as composable storage resources (102) (see e.g., FIG. 1A). Further, the remote storage (150) may be provisioned through, using, or as a storage namespace (158). The storage namespace (158) may represent a logically separated, individually addressable subset (or portion) of the logical storage pool, where said logical storage pool subset/portion may span, in whole or in part, on/across one or more of the aforementioned at least one physical storage device. The storage namespace (158), moreover, may be assigned, or associated with, a (storage) namespace identifier (ID) representing any arbitrary length character string that uniquely identifies, as well as allows discovery of and access to, the storage namespace (158).

In one or many embodiment(s) described herein, the remote memory (152) may encompass virtual memory provisioned to the composed service host (116) or, more specifically, to the composed service (122) deployed thereon. The remote memory (152) may be backed by or abstracted from at least a subset of at least one physical memory device—each in whole or in part—which, through interconnection or combination, form a logical memory pool referred to herein as composable memory resources (106) (see e.g., FIG. 1A). Further, the remote memory (152) may be provisioned through, using, or as a memory namespace (160). The memory namespace (160) may represent a logically separated, individually addressable subset (or portion) of the logical memory pool, where said logical memory pool subset/portion may span, in whole or in part, on/across one or more of the aforementioned at least one physical memory device. The memory namespace (160), moreover, may be assigned, or associated with, a (memory) namespace identifier (ID) representing any arbitrary length character string that uniquely identifies, as well as allows discovery of and access to, the memory namespace (160).

In one or many embodiment(s) described herein, the remote initialization memory (154) may encompass virtual memory provisioned to the composed service host (116) or, more specifically, to the composed service (122) deployed thereon. The remote initialization memory (154) may be backed by or abstracted from at least a subset of at least one physical memory device—each in whole or in part—which, through interconnection or combination, form a logical memory pool referred to herein as composable memory resources (106) (see e.g., FIG. 1A). Further, the remote initialization memory (154) may be provisioned through, using, or as a service initialization memory namespace (162). The service initialization memory namespace (162) may represent a logically separated, individually addressable subset (or portion) of the logical memory pool, where said logical memory pool subset/portion may span, in whole or in part, on/across one or more of the aforementioned at least one physical memory device. The service initialization memory namespace (162), moreover, may be assigned, or associated with, a (service initialization memory) namespace identifier (ID) representing any arbitrary length character string that uniquely identifies, as well as allows discovery of and access to, the service initialization memory namespace (162).

In one or many embodiment(s) described herein, the service initialization memory namespace (162), and thus the remote initialization memory (154), may be created and provisioned to specifically store initialization-pertinent information (e.g., service configuration settings, long-term service state, and service metadata) necessary to initialize (or re-initialize) the composed service (122).

In one or many embodiment(s) described herein, the remote accelerated computing (156) may encompass virtual accelerated computing provisioned to the composed service host (116) or, more specifically, to the composed service (122) deployed thereon. The remote accelerated computing (156) may be backed by or abstracted from at least a subset of at least one physical accelerator device—each in whole or in part—which, through interconnection or combination, form a logical accelerator pool referred to herein as composable accelerator resources (110) (see e.g., FIG. 1A). Further, the remote accelerated computing (156) may be provisioned through, using, or as an accelerator namespace (164). The accelerator namespace (164) may represent a logically separated, individually addressable subset (or portion) of the logical accelerator pool, where said logical accelerator pool subset/portion may span, in whole or in part, on/across one or more of the aforementioned at least one physical accelerator device. The accelerator namespace (164), moreover, may be assigned, or associated with, a/an (accelerator) namespace identifier (ID) representing any arbitrary length character string that uniquely identifies, as well as allows discovery of and access to, the accelerator namespace (164).

In one or many embodiment(s) described herein, the (optional) host operating system (166) may refer to a computer program that may execute on the underlying hardware of the composed service host (116), which may be responsible for overseeing composed service host (116) operations. To that extent, and at least in part, the (optional) host operating system (166) may include functionality to: support fundamental composed service host (116) functions; schedule tasks; mediate interactivity between logical (e.g., software) and physical (e.g., hardware) composed service host (116) components; allocate the local resources (140) and/or the remote sources (148) as needed; and execute or invoke other computer program(s) (e.g., host hypervisor (168)) executing on the composed service host (116). One of ordinary skill, however, will appreciate that the (optional) host operating system (166) may perform other functionalities without departing from the scope of the embodiments described herein.

In one or many embodiment(s) described herein, the host hypervisor (168) may refer to a computer program that may execute on the underlying hardware of the composed service host (116), which may be responsible for managing virtualization resources (e.g., virtual machines and/or containers, such as the composed service (122)) deployed on the composed service host (116). To that extent, and at least in part, the host hypervisor (168) may include functionality to: allocate and de-allocate any granularity of the local resources (140) and/or the remote resources (148) as needed to support the operation of the composed service (122) (either through interfacing with the host operating system (166) if installed or through interfacing with said resources (140, 148) if the host operating system (166) is not installed); and facilitate fast service initialization of the composed service (122) using the remote initialization memory (154)—the methods illustrated and described with respect to FIGS. 3 and 4, below. One of ordinary skill, however, will appreciate that the host hypervisor (168) may perform other functionalities without departing from the scope of the embodiments described herein.

In one or many embodiment(s) described herein, the composed service (122) (see e.g., FIG. 1A) may refer to a virtual network server (e.g., a virtual machine or a container configured to emulate a physical network server) whereon a guest operating system and/or any number of workloads (e.g., applications) may execute. When resources (e.g., any granularity of the local resources (140) and/or the remote resources (148)) may be needed to support the workload(s) tasked to execute, the composed service (122) may include functionality to: communicate or request said needed resources to the host hypervisor (168) and, subsequently, receive access to said needed resources therefrom. One of ordinary skill, however, will appreciate that the composed service (122) may perform other functionalities without departing from the scope of the embodiments described herein.

While FIG. 1B shows a configuration of components and/or subcomponents, other composed service host (116) configurations may be used without departing from the scope of the embodiments described herein.

Figure 2A:
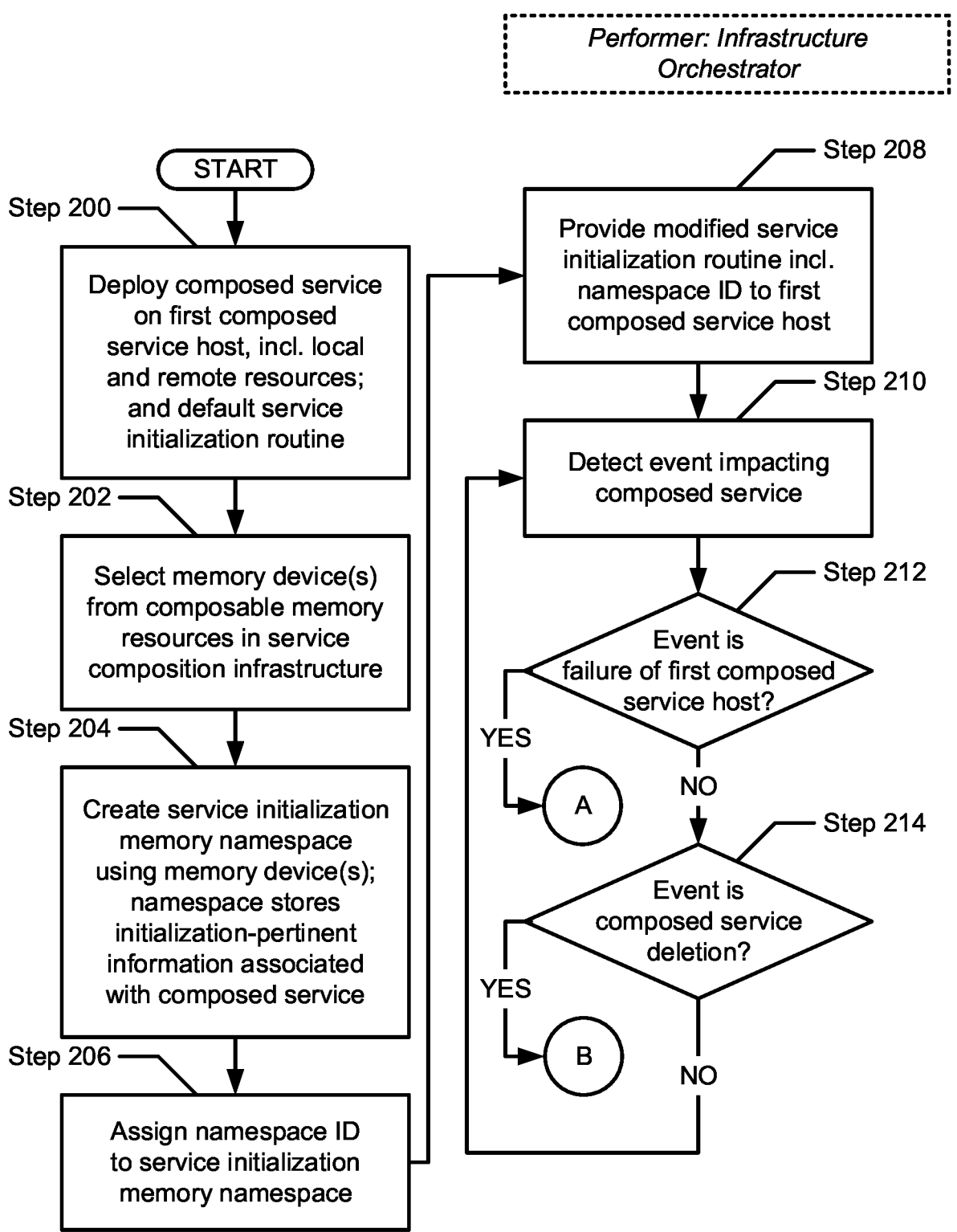
FIGS. 2A and 2B show a flowchart describing a method for service initialization memory namespace creation, distribution, and deletion in accordance with one or more embodiments described herein.
Figure 2B:
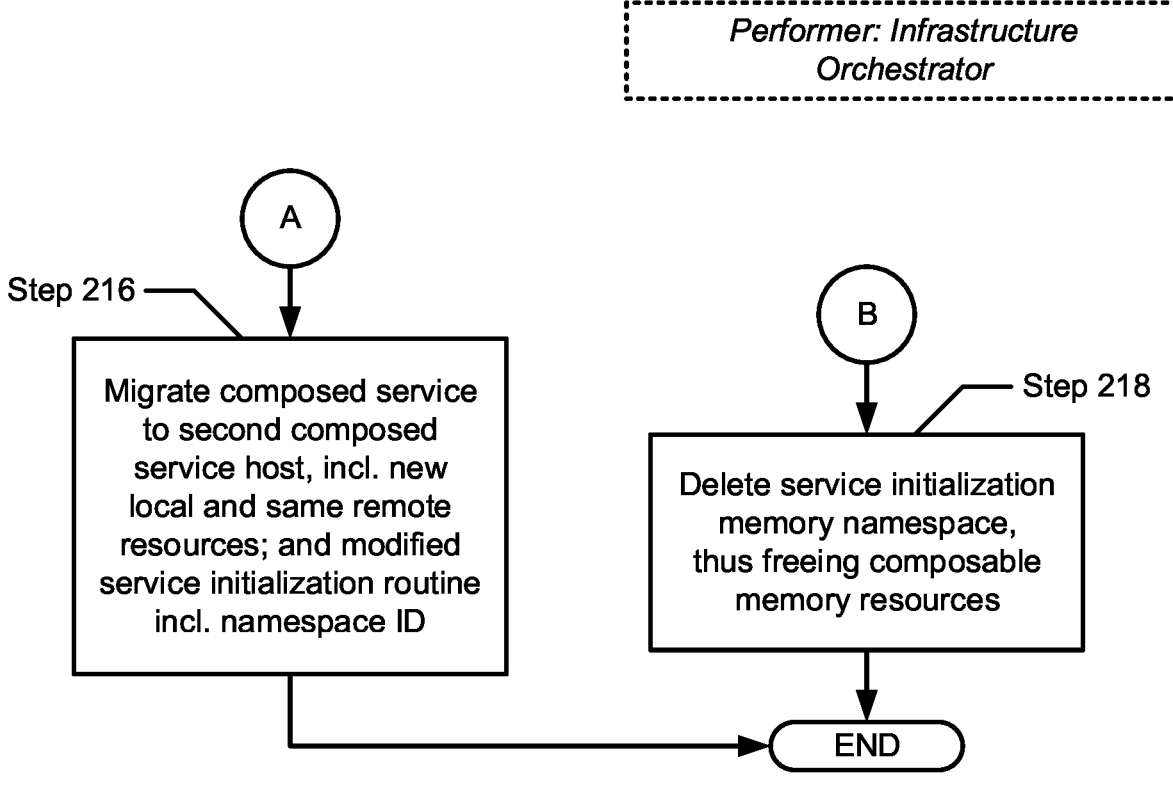

FIGS. 2A and 2B show a flowchart describing a method for service initialization memory namespace creation, distribution, and deletion in accordance with one or more embodiments described herein. The various steps outlined below may be performed by the infrastructure orchestrator of the service composition infrastructure (see e.g., FIG. 1A). Further, while the various steps in the flowchart are presented and described sequentially, one of ordinary skill will appreciate that some or all steps may be executed in different orders, may be combined or omitted, and some or all steps may be executed in parallel.

Turning to FIG. 2A, in Step 200, a composed service is deployed on a first composed service host (see e.g., FIGS. 1A and 1B). In one or many embodiment(s) described herein, the first composed service host may provide local resources (e.g., local compute, local memory, and local networking) native thereto and may have access to remote resources (e.g., at least one of remote storage, remote memory, and remote accelerated computing) provisioned thereto by the infrastructure orchestrator of the service composition infrastructure.

Further, in one or many embodiment(s) described herein, a default service initialization routine may be made available to a host hypervisor operating on, and may be stored in the local memory of, the first composed service host (see e.g., FIG. 1B). The default service initialization routine may refer to computer readable program code, which when executed by the host hypervisor, may enable the host hypervisor to initialize the composed service from a reset state to an operational state. To facilitate the aforementioned state transition, the default service initialization routine may call on (or need access to) initialization-pertinent information (e.g., service configuration settings, long-term service state, and service metadata) necessary to initialize (or re-initialize) the composed service. The default service initialization routine, moreover, may instruct the host hypervisor to locate and retrieve the initialization-pertinent information from the local memory of the first composed service host.

In Step 202, one or more memory devices (see e.g., FIG. 1A) is/are selected from composable memory resources of the service composition infrastructure. In one or many embodiment(s) described herein, selection of the memory device(s) may be contingent on one or more criteria (e.g., memory device utilization metrics).

In Step 204, a service initialization memory namespace is created. In one or many embodiment(s) described herein, a namespace may generally refer to a logically separated, individually addressable subset of a logical pool of a certain resource that may span, in whole or in part, on/across one or more physical devices of said certain resource. The service initialization memory namespace, accordingly, may represent a namespace where said certain resource is non-volatile memory. Further, the service initialization memory namespace may encompass a subset of the logical memory pool (see e.g., FIG. 1A) that spans on/across the memory device(s) (selected in Step 202). Moreover, the service initialization memory namespace may be dedicated to storing the initialization-pertinent information (described above) (see e.g., Step 200) associated with the composed service deployed on the first composed service host.

In Step 206, a namespace identifier (ID) is generated and assigned to the service initialization memory namespace (created in Step 204). In one or many embodiment(s) described herein, the namespace ID may refer to any arbitrary length character string that uniquely identifies, as well as allows discovery of and access to, the service initialization memory namespace.

In Step 208, a modified service initialization routine is provided to the first composed service host. In one or many embodiment(s) described herein, the modified service initialization routine may include the namespace ID (assigned in Step 206) and may reflect a modification to the default service initialization routine (mentioned in Step 200). More specifically, like the default service initialization routine, the modified service initialization routine may refer to computer readable program code, which when executed by the host hypervisor on the first composed service host, may enable the host hypervisor to initialize the composed service (deployed on the first composed service host) from a reset state to an operational state; and, in order to facilitate the aforementioned state transition, may call on (or need access to) initialization-pertinent information (e.g., service configuration settings, long-term service state, and service metadata) necessary to initialize (or re-initialize) the composed service. However, unlike the default service initialization routine, the modified service initialization routine may instruct the host hypervisor to locate and retrieve the initialization-pertinent information from the service initialization memory namespace (instead of from the local memory of the first composed service host as did the default service initialization routine). The service initialization memory namespace may be discoverable using the namespace ID, and may be presented on the first composed service host as remote initialization memory (see e.g., FIG. 1B). When adopted, the modified service initialization routine may replace the default service initialization routine that had been stored in the local memory of the first composed service host.

In Step 210, an event, impacting the composed service deployed on the first composed service host, is detected. In one or many embodiment(s) described herein, the event may indicate a detected failure of the first composed service host due to, for example, human error, cyber-attacks, hardware and/or software failure, power outages, and/or natural disasters. In one or many other embodiment(s) described herein, the event may indicate a detected deletion of the composed service by, for example, an infrastructure administrator or tenant/customer. The detected event, further, is not limited to the aforementioned specific examples.

In Step 212, a determination is made as to whether the event (detected in Step 210) pertains to the detected failure of the first composed service host. In one or many embodiment(s) described herein, if it is determined that the detected event is indeed related to the failure of the first composed service host, then the method proceeds to Step 216 (see e.g., FIG. 2B). On the other hand, in one or many other embodiment(s) described herein, if it is alternatively determined that the detected event is not related to the failure of the first composed service host, then the method alternatively proceeds to Step 214.

In Step 214, following the determination (made in Step 212) that the event (detected in Step 210) is not related to the failure of the first composed service host, a determination is made as to whether the event pertains to the detected deletion of the composed service. In one or many embodiment(s) described herein, if it is determined that the detected event is indeed related to the deletion of the composed service, then the method proceeds to Step 218 (see e.g., FIG. 2B). On the other hand, in one or many other embodiment(s) described herein, if it is alternatively determined that the detected event is not related to the deletion of the composed service, then the method alternatively proceeds to Step 210, where a period of waiting may precede until another event, that may impact the composed service, may be detected.

Turning to FIG. 2B, in Step 216, following the determination (made in Step 212) that the event (detected in Step 210) is related to the failure of the first composed service host, the composed service, which had been operating on the first composed service host prior to said failure, is migrated to a second composed service host. In one or many embodiment(s) described herein, the second composed service host may provide new local resources (e.g., local compute, local memory, and local networking) native thereto and may be given access to the same remote resources (e.g., at least one of remote storage, remote memory, remote initialization memory, and remote accelerated computing) that had been provisioned to the first composed service host. Further, the second composed service host may be immediately updated with the modified service initialization routine (provided to the first composed service host in Step 208) instead of (or to replace) the default service initialization routine that serves as the default routine initially installed on all/any composed service host.

In Step 218, following the determination (made in Step 214) that the event (detected in Step 210) is related to the deletion of the composed service, which had been operating on the first composed service host prior to said deletion, the service initialization memory namespace (created in Step 204) is subsequently deleted. In one or many embodiment(s) described herein, deletion of the service initialization memory namespace may result in the freeing of the subset of the composable memory resources (i.e., the subset of the logical memory pool) that had been created and provisioned. Further, freeing of said subset of the logical memory pool, representative of the service initialization memory namespace, may only trigger should the owning service (i.e., the composed service) experience deletion. Alternatively, the service initialization memory namespace may remain intact throughout any other transpiring events (e.g., power cycling or rebooting of the first or second composed service host, failure of the first or second composed service host, failover to a backup system, migration of the composed service to the second, third, fourth, etc. composed service host, etc.).

Figure 3:
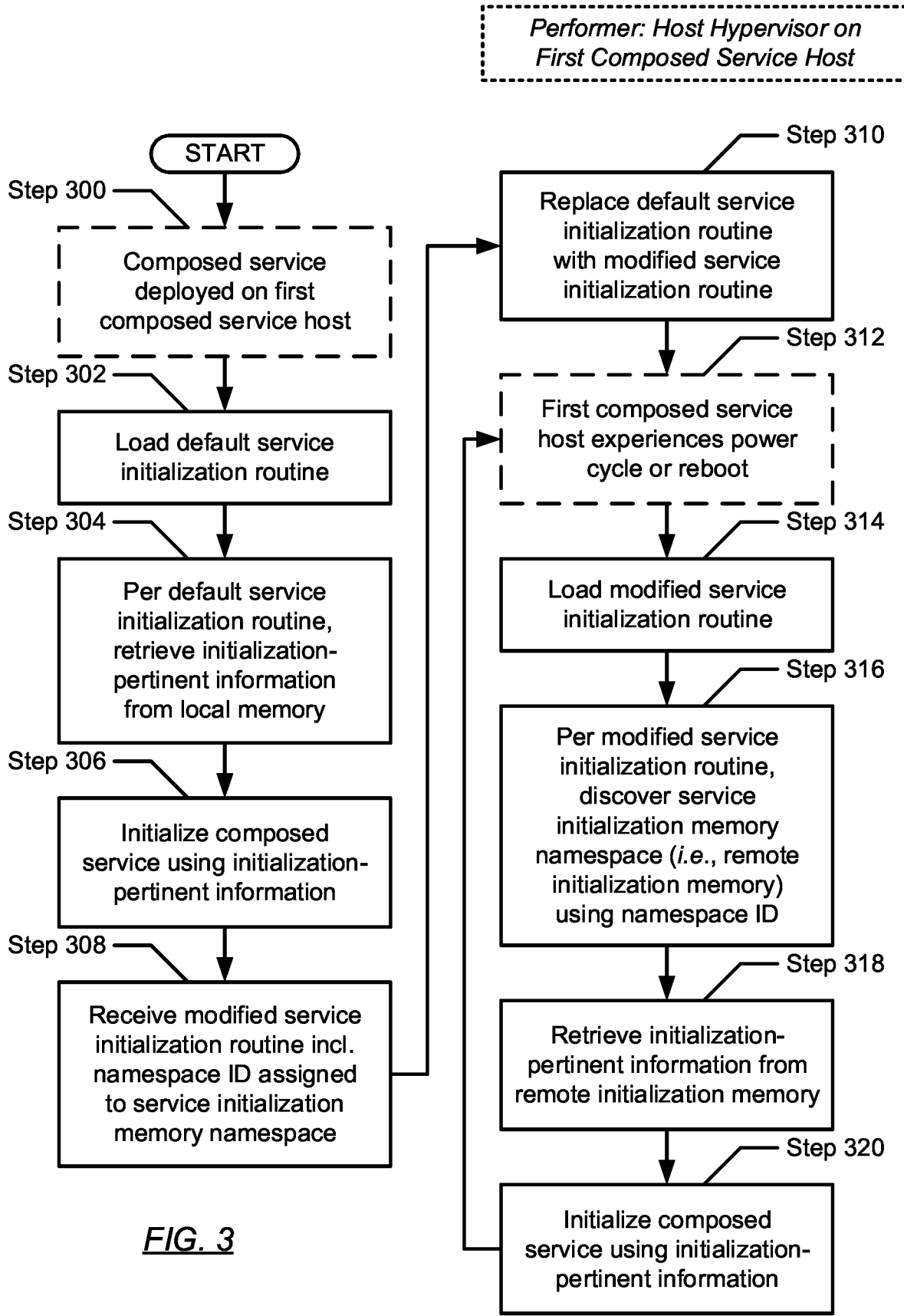
FIG. 3 shows a flowchart describing a method for fast service initialization using remote memory in accordance with one or more embodiments described herein.

FIG. 3 shows a flowchart describing a method for fast service initialization using remote memory in accordance with one or more embodiments described herein. The various steps outlined below may be performed by a host hypervisor of a composed service host (e.g., the first composed service host mentioned in FIGS. 2A and 2B above) whereon a composed service has been deployed (see e.g., FIGS. 1A and 1B). Further, while the various steps in the flowchart are presented and described sequentially, one of ordinary skill will appreciate that some or all steps may be executed in different orders, may be combined or omitted, and some or all steps may be executed in parallel.

Turning to FIG. 3, in Step 300, the composed service is deployed on the (first) composed service host (see e.g., FIG. 1B). In one or many embodiment(s) described herein, the (first) composed service host may provide local resources (e.g., local compute, local memory, and local networking) native thereto and may have access to remote resources (e.g., at least one of remote storage, remote memory, and remote accelerated computing) provisioned thereto by the infrastructure orchestrator of the service composition infrastructure.

Further, in one or many embodiment(s) described herein, a default service initialization routine may be made available to the host hypervisor, and may be stored in the local memory of, the (first) composed service host (see e.g., FIG. 1B). The default service initialization routine may refer to computer readable program code, which when executed by the host hypervisor, may enable the host hypervisor to initialize the composed service from a reset state to an operational state. To facilitate the aforementioned state transition, the default service initialization routine may call on (or need access to) initialization-pertinent information (e.g., service configuration settings, long-term service state, and service metadata) necessary to initialize (or re-initialize) the composed service. The default service initialization routine, moreover, may instruct the host hypervisor to locate and retrieve the initialization-pertinent information from the local memory of the (first) composed service host.

In Step 302, following deployment of the composed service (in Step 300), the default service initialization routine is loaded. In one or many embodiment(s) described herein, loading of the default service initialization routine may entail retrieval thereof from the local memory of the (first) composed service host and the execution thereof thereafter.

In Step 304, while executing, and thus per, the default service initialization routine (loaded in Step 302), initialization-pertinent information, respective to the initialization of the composed service, is located and retrieved from the local memory of the (first) composed service host.

In Step 306, the composed service, subsequently, is initialized using the initialization-pertinent information (retrieved in Step 304). In one or many embodiment(s) described herein, initialization of the composed service may transition the composed service from a reset state to an operational state.

In Step 308, a modified service initialization routine is received from the infrastructure orchestrator of the service composition infrastructure (see e.g., FIG. 1A). In one or many embodiment(s) described herein, the modified service initialization routine may include a namespace identifier (ID) belonging to a service initialization memory namespace (described above) (see e.g., Step 204 in FIG. 2A). The namespace ID encompasses any arbitrary length character string that uniquely identifies, as well as allows discovery of and access to, the service initialization memory namespace.

Further, in one or many embodiment(s) described herein, the modified service initialization routine may reflect a modification to the default service initialization routine (loaded in Step 302). More specifically, like the default service initialization routine, the modified service initialization routine may refer to computer readable program code, which when executed by the host hypervisor, may enable the host hypervisor to initialize the composed service from a reset state to an operational state; and, in order to facilitate the aforementioned state transition, may call on (or need access to) initialization-pertinent information (e.g., service configuration settings, long-term service state, and service metadata) necessary to initialize (or re-initialize) the composed service. However, unlike the default service initialization routine, the modified service initialization routine may instruct the host hypervisor to locate and retrieve the initialization-pertinent information from the service initialization memory namespace (instead of from the local memory of the (first) composed service host as did the default service initialization routine). The service initialization memory namespace may presented on the (first) composed service host as remote initialization memory (see e.g., FIG. 1B).

In Step 310, the default service initialization routine (loaded in Step 302) is replaced with the modified service initialization routine (received in Step 310). In one or many embodiment(s) described herein, said replacement may entail storing the modified service initialization routine within the local memory of the (first) composed service host in place of the default service initialization routine.

In Step 312, a power cycle or reboot is experienced by the (first) composed service host.

In Step 314, following the first composed service host power cycle or reboot (experienced in Step 312), the modified service initialization routine (received in Step 308) is loaded. In one or many embodiment(s) described herein, loading of the modified service initialization routine may entail retrieval thereof from the local memory of the (first) composed service host and the execution thereof thereafter.

In Step 316, while executing, and thus per, the modified service initialization routine (loaded in Step 314), the service initialization memory namespace is discovered using the namespace ID assigned thereto. In one or many embodiment(s) described herein, following discovery, the service initialization memory namespace may be presented on the (first) composed service host as remote initialization memory (see e.g., FIG. 1B).

In Step 318, initialization-pertinent information (e.g., service configuration settings, long-term service state, and service metadata), respective to the initialization of the composed service, is located and retrieved from the remote initialization memory made available on the (first) composed service host.

In Step 320, the composed service, subsequently, is (re-)initialized using the initialization-pertinent information (retrieved in Step 318). In one or many embodiment(s) described herein, (re-)initialization of the composed service may transition the composed service from a reset state to an operational state. Hereinafter, the method proceeds to Step

312, where a period of waiting may precede until another power cycle or reboot may be experienced by the (first) composed service host.

FIG. 4 shows a flowchart describing a method for fast service initialization using remote memory in accordance with one or more embodiments described herein. The various steps outlined below may be performed by a host hypervisor of a composed service host (e.g., the second composed service host mentioned in FIGS. 2A and 2B above) whereon a composed service has migrated (see e.g., FIGS. 1A and 1B). Further, while the various steps in the flowchart are presented and described sequentially, one of ordinary skill will appreciate that some or all steps may be executed in different orders, may be combined or omitted, and some or all steps may be executed in parallel.

Turning to FIG. 4, in Step 400, the composed service is migrated to the (second) composed service host. In one or many embodiment(s) described herein, the composed service may have initially been deployed on another (i.e., a first) composed service host that experienced a failure event preceding the migration. Further, the (second) composed service host may provide local resources (e.g., local compute, local memory, and local networking) native thereto and may have access to remote resources (e.g., at least one of remote storage, remote memory, and remote accelerated computing) provisioned originally to the other (first) composed service host and, subsequently, made available to the (second) composed service host. Any workload(s) and/or data handled by the remote resources may have been unaffected by the failure event experienced by the other (first) composed service host; and, accordingly, once (re-)initialized on the (second) composed service host, the composed service may resume operations where it left off prior to the other (first) composed service host failing.

Moreover, in one or many embodiment(s) described herein, a modified service initialization routine may be made available to the host hypervisor, and may be stored in the local memory of, the (second) composed service host (see e.g., FIG. 1B). The modified service initialization routine may refer to computer readable program code, which when executed by the host hypervisor, may enable the host hypervisor to (re-)initialize the composed service from a reset state to an operational state. To facilitate the aforementioned state transition, the modified service initialization routine may call on (or need access to) initialization-pertinent information (e.g., service configuration settings, long-term service state, and service metadata) necessary to (re-)initialize the composed service. The modified service initialization routine, moreover, may instruct the host hypervisor to locate and retrieve the initialization-pertinent information from a service initialization memory namespace (described above) (see e.g., Step 204 in FIG. 2A). Also, the modified service initialization routine may include a namespace identifier (ID) belonging to the service initialization memory namespace, where the namespace ID encompasses any arbitrary length character string that uniquely identifies, as well as allows discovery of and access to, the service initialization memory namespace.

In Step 402, following migration of the composed service to the (second) composed service host, the modified service initialization routine (mentioned in Step 400) is loaded. In one or many embodiment(s) described herein, loading of the modified service initialization routine may entail retrieval thereof from the local memory of the (second) composed service host and the execution thereof thereafter.

In Step 404, while executing, and thus per, the modified service initialization routine (loaded in Step 402), the service initialization memory namespace is discovered using the namespace ID assigned thereto. In one or many embodiment(s) described herein, following discovery, the service initialization memory namespace may be presented on the (second) composed service host as remote initialization memory (see e.g., FIG. 1B).

In Step 406, initialization-pertinent information (e.g., service configuration settings, long-term service state, and service metadata), respective to the (re-)initialization of the composed service, is located and retrieved from the remote initialization memory made available on the (second) composed service host.

In Step 408, the composed service, subsequently, is (re-) initialized using the initialization-pertinent information (retrieved in Step 406). In one or many embodiment(s) described herein, (re-)initialization of the composed service may transition the composed service from a reset state to an operational state.

Figure 5:
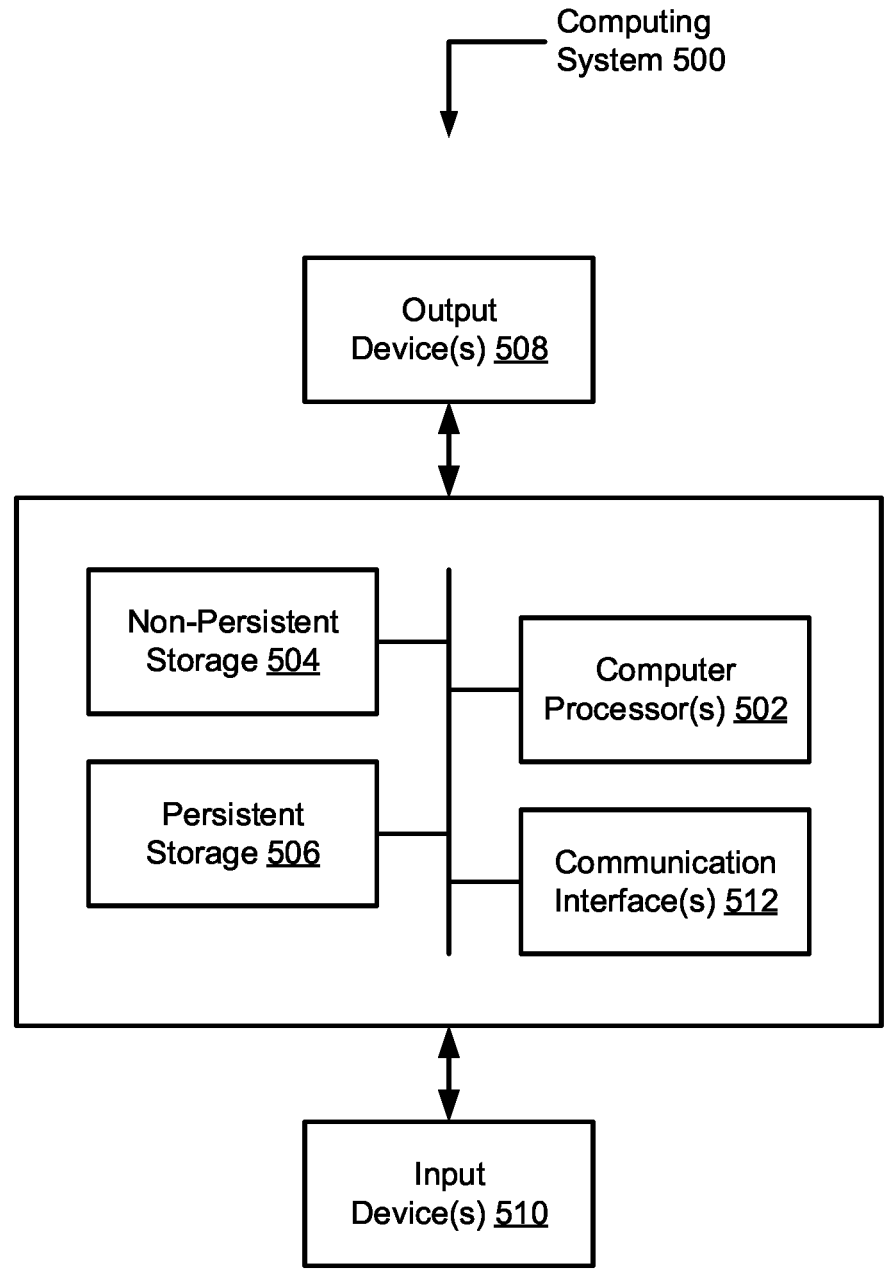
FIG. 5 shows a computing system in accordance with one or more embodiments described herein.

FIG. 5 shows a computing system in accordance with one or more embodiments described herein. The computing system (500) may include one or more computer processors (502), non-persistent storage (504) (e.g., volatile memory, such as random access memory (RAM), cache memory), persistent storage (506) (e.g., a hard disk, an optical drive such as a compact disk (CD) drive or digital versatile disk (DVD) drive, a flash memory, etc.), a communication interface (512) (e.g., Bluetooth interface, infrared interface, network interface, optical interface, etc.), input devices (510), output devices (508), and numerous other elements (not shown) and functionalities. Each of these components is described below.

In one or many embodiment(s) described herein, the computer processor(s) (502) may be an integrated circuit for processing instructions. For example, the computer processor(s) may be one or more cores or micro-cores of a central processing unit (CPU) and/or a graphics processing unit (GPU). The computing system (500) may also include one or more input devices (510), such as a touchscreen, keyboard, mouse, microphone, touchpad, electronic pen, or any other type of input device. Further, the communication interface (512) may include an integrated circuit for connecting the computing system (500) to a network (not shown) (e.g., a local area network (LAN), a wide area network (WAN) such as the Internet, mobile network, or any other type of network) and/or to another device, such as another computing device.

In one or many embodiment(s) described herein, the computing system (500) may include one or more output devices (508), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (502), non-persistent storage (504), and persistent storage (506). Many different types of computing systems exist, and the aforementioned input and output device(s) may take other forms.

Software instructions in the form of computer readable program code to perform embodiments described herein may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that, when executed by a processor(s), is configured to perform one or more embodiments described herein.

While the technology has been described with respect to a limited number of embodiments, those skilled in the art, having benefit of this disclosure, will appreciate that other embodiments can be devised which do not depart from the scope of the embodiments described herein. Accordingly, the scope of the embodiments described herein should be limited only by the attached claims.

What is claimed is:

1. A method for fast service initialization, the method comprising:

receiving a modified service initialization routine comprising a namespace identifier (ID);

replacing a default service initialization routine for a composed service with the modified service initialization routine, wherein a composed service host comprises a local memory initially configured with at least the default service initialization routine and initialization-pertinent information, wherein the default service initialization routine calls for the initialization-pertinent information to be retrieved from the local memory;

following deployment of the composed service on the composed service host and the composed service host thereafter experiencing an event impacting the composed service, wherein the event impacting the composed service comprises a detected deletion of the composed service, a power cycle or a reboot:

loading the modified service initialization routine for the composed services, wherein the modified service initialization routine enables a host hypervisor to initialize the composed service from a reset state to an operational state;

discovering, based on the modified service initialization routine, a service initialization memory namespace using the namespace ID assigned thereto;

presenting the service initialization memory namespace on the composed service host as remote initialization memory, wherein the presenting comprises enabling access to the service initialization memory namespace over a low latency memory fabric comprising a compute express link (CXL) network, wherein the remote initialization memory is external to the composed service host;

retrieving the initialization-pertinent information for the composed service from the remote initialization memory, wherein the initialization-pertinent information comprises service configuration settings and service metadata; and initializing the composed service using the initialization-pertinent information, wherein the composed service is in the operational state.

2. The method of claim 1, wherein the default service initialization routine calls for the initialization-pertinent information to be retrieved from the local memory.

3. The method of claim 1, wherein the service initialization memory namespace comprises a logically separated, individually addressable subset of a logical memory pool formed from disaggregated memory.

4. The method of claim 1, the method further comprising:

following the composed service host further experiencing a failure and thereafter migrating the composed service to a second composed service host:

loading the modified service initialization routine for the composed service;

discovering, based on the modified service initialization routine, the service initialization memory namespace using the namespace ID assigned thereto;

presenting the service initialization memory namespace on the second composed service host as the remote initialization memory;

retrieving the initialization-pertinent information for the composed service from the remote initialization memory; and re-initializing the composed service using the initialization-pertinent information.

5. The method of claim 4, wherein the second composed service host comprises a local memory initially configured with at least the modified service initialization routine comprising the namespace ID.

6. A non-transitory computer readable medium comprising computer readable program code, which when executed by a computer processor on a composed service host, enables the computer processor to perform a method for fast service initialization, the method comprising:

receiving a modified service initialization routine comprising a namespace identifier (ID):

replacing a default service initialization routine for a composed service with the modified service initialization routine, wherein a composed service host comprises a local memory initially configured with at least the default service initialization routine and initialization-pertinent information, wherein the default service initialization routine calls for the initialization-pertinent information to be retrieved from the local memory;

following deployment of the composed service on the composed service host and the composed service host thereafter experiencing an event impacting the composed service, wherein the event impacting the composed service comprises a detected deletion of the composed service, a power cycle or a reboot:

loading the modified service initialization routine for the composed service, wherein the modified service initialization routine enables a host hypervisor to initialize the composed service from a reset state to an operational state;

discovering, based on the modified service initialization routine, a service initialization memory namespace using the namespace ID assigned thereto;

presenting the service initialization memory namespace on the composed service host as remote initialization memory, wherein the presenting comprises enabling access to the service initialization memory namespace over a low latency memory fabric comprising a compute express link (CXL) network, wherein the remote initialization memory is external to the composed service host;

retrieving the initialization-pertinent information for the composed service from the remote initialization memory, wherein the initialization-pertinent information comprises service configuration settings and service metadata; and initializing the composed service using the initialization-pertinent information, wherein the composed service is in the operational state.

7. The non-transitory computer readable medium of claim 6, wherein the default service initialization routine calls for the initialization-pertinent information to be retrieved from the local memory.

8. The non-transitory computer readable medium of claim 6, wherein the service initialization memory namespace comprises a logically separated, individually addressable subset of a logical memory pool formed from disaggregated memory.

9. The non-transitory computer readable medium of claim 6, the method further comprising second computer readable program code, which when executed by a second computer processor on a second composed service host, enables the second computer processor to perform the method, the method further comprising:

following the composed service host further experiencing a failure and thereafter migrating the composed service to the second composed service host:

loading the modified service initialization routine for the composed service;

discovering, based on the modified service initialization routine, the service initialization memory namespace using the namespace ID assigned thereto;

presenting the service initialization memory namespace on the second composed service host as the remote initialization memory;

retrieving the initialization-pertinent information for the composed service from the remote initialization memory; and re-initializing the composed service using the initialization-pertinent information.

10. The non-transitory computer readable medium of claim 9, wherein the second composed service host comprises a local memory initially configured with at least the modified service initialization routine comprising the namespace ID.

11. A service composition infrastructure, comprising:

a composed service host comprising:

a computer processor; and a host hypervisor executing on the computer processor, and configured to perform a method for fast service initialization, the method comprising:

receiving a modified service initialization routine comprising a namespace identifier (ID);

replacing a default service initialization routine for a composed service with the modified service initialization routine, wherein a composed service host comprises a local memory initially configured with at least the default service initialization routine and initialization-pertinent information, wherein the default service initialization routine calls for the initialization-pertinent information to be retrieved from the local memory;

following deployment of the composed service on the composed service host and the composed service host thereafter experiencing an event impacting the composed service, wherein the event impacting the composed service comprises a detected deletion of the composed service, a power cycle or a reboot:

loading the modified service initialization routine for the composed service, wherein the modified service initialization routine enables the host hypervisor to initialize the composed service from a reset state to an operational state;

discovering, based on the modified service initialization routine, a service initialization memory namespace using the namespace ID assigned thereto;

presenting the service initialization memory namespace on the composed service host as remote initialization memory, wherein the presenting comprises enabling access to the service initialization memory namespace over a low latency memory fabric comprising a compute express link (CXL) network, wherein the remote initialization memory is external to the composed service host;

retrieving the initialization-pertinent information for the composed service from the remote initialization memory, wherein the initialization-pertinent information comprises service configuration settings and service metadata; and initializing the composed service using the initialization-pertinent information, wherein the composed service is in the operational state.

12. The service composition infrastructure of claim 11, further comprising:

a logical memory pool formed from disaggregated memory, and operatively connected to the composed service host, wherein the service initialization memory namespace comprises a logically separated, individually addressable subset of the logical memory pool.

13. The service composition infrastructure of claim 11, further comprising:

a second service host comprising:

a second computer processor; and a second host hypervisor executing on the second computer processor, and configured to perform the method for fast service initialization, the method further comprising:

following the composed service host further experiencing a failure and thereafter migrating the composed service to the second composed service host:

loading the modified service initialization routine for the composed service;

discovering, based on the modified service initialization routine, the service initialization memory namespace using the namespace ID assigned thereto;

presenting the service initialization memory namespace on the second composed service host as the remote initialization memory;

retrieving the initialization-pertinent information for the composed service from the remote initialization memory; and re-initializing the composed service using the initialization-pertinent information.

14. The service composition infrastructure of claim 13, wherein the second composed service host further comprises:

a second local memory operatively connected to the second computer processor, and initially configured with at least the modified service initialization routine comprising the namespace ID.

* * * * *